United States Patent
Youn et al.

(10) Patent No.: US 6,683,016 B1
(45) Date of Patent: Jan. 27, 2004

(54) SUPPORTED METALLOCENE CATALYST, ITS PREPARATION METHOD AND OLEFIN POLYMERIZATION THEREWITH

(75) Inventors: Hyun-Ki Youn, Daejeon (KR); Sah-Mun Hong, Daejeon (KR); Young-Jae Jun, Daejeon (KR); Tae-Soo Hwang, Daejeon (KR); Sung-Woo Kang, Daejeon (KR); Young-Ju Kim, Yeocheon (KR); Tae-Gon Kim, Daejeon (KR)

(73) Assignee: Daelim Industrial Co., Ltd., Seoul (KR)

( * ) Notice: Subject to any disclaimer, the term of this patent is extended or adjusted under 35 U.S.C. 154(b) by 0 days.

(21) Appl. No.: 09/582,187
(22) PCT Filed: Oct. 22, 1999
(86) PCT No.: PCT/KR99/00635
§ 371 (c)(1),
(2), (4) Date: Oct. 27, 2000
(87) PCT Pub. No.: WO00/23483
PCT Pub. Date: Apr. 27, 2000

(30) Foreign Application Priority Data

Oct. 22, 1998 (KR) ............................................. 98/44308

(51) Int. Cl.$^7$ ........................... B01J 31/00; B01J 37/00; C08F 4/02; C08F 4/60
(52) U.S. Cl. ..................................................... 502/117
(58) Field of Search ......................... 502/117

(56) References Cited

U.S. PATENT DOCUMENTS

| | | |
|---|---|---|
| 4,551,690 A * | 11/1985 | Quist .................. 331/36 L |
| 4,701,432 A | 10/1987 | Welborn |
| 4,730,071 A | 3/1988 | Schoenthal et al. |
| 4,808,561 A | 2/1989 | Welborn |
| 4,897,455 A | 1/1990 | Welborn |
| 4,912,075 A | 3/1990 | Chang |
| 4,935,397 A | 6/1990 | Chang |
| 4,937,217 A | 6/1990 | Chang |
| 4,937,301 A | 6/1990 | Chang |
| 5,001,205 A | 3/1991 | Hoel |
| 5,008,228 A | 4/1991 | Chang |
| 5,086,025 A | 2/1992 | Chang |
| 5,147,949 A | 9/1992 | Chang |
| 5,238,892 A | 8/1993 | Chang |

(List continued on next page.)

FOREIGN PATENT DOCUMENTS

| | | |
|---|---|---|
| EP | 0 258 924 A2 | 3/1988 |
| EP | 0 826 699 A1 | 3/1998 |
| WO | WO 94/21691 | 9/1994 |

OTHER PUBLICATIONS

US 5,883,203, 3/1999, Cheruvu et al. (withdrawn)

*Primary Examiner*—Mark L. Bell
*Assistant Examiner*—Jennine Brown
(74) *Attorney, Agent, or Firm*—Gifford, Krass, Groh, Sprinkle, Anderson & Citkowski, P.C.

(57) ABSTRACT

The present invention relates to supported metallocene catalysts and to new processes for preparing them and olefin polymerization therewith. Specifically, this invention relates to supported catalyst benefiting from the penetration and homogeneous distribution of catalyst components containing one or more metallocenes and activators within porous support particles. A new process for preparing the catalyst of the invention provides for a supported metallocene catalyst, wherein one or more metallocenes and activator, a solvent capable of dissolving them and a porous support are mutually contacted to form a slurry and a sonic wave or vibrating wave in the frequency range of 1–10,000 kHz is applied to the slurry and the solvent is removed and the resultants are dried. The catalyst are useful for olefin polymerization in a slurry and gas phase polymerization process.

12 Claims, 2 Drawing Sheets

U.S. PATENT DOCUMENTS

| | | |
|---|---|---|
| 5,240,894 A | 8/1993 | Burkhardt et al. |
| 5,308,816 A | 5/1994 | Tsutsui et al. |
| 5,332,706 A | 7/1994 | Nowlin et al. |
| 5,399,636 A | 3/1995 | Alt et al. |
| 5,420,220 A | 5/1995 | Cheruvu et al. |
| 5,455,316 A | 10/1995 | Tsutsui et al. |
| 5,466,766 A | 11/1995 | Patsidis et al. |
| 5,473,020 A | 12/1995 | Peifer et al. |
| 5,473,028 A | 12/1995 | Nowlin et al. |
| 5,587,439 A * | 12/1996 | DiMaio ................ 526/142 |
| 5,602,067 A | 2/1997 | Nowlin et al. |
| 5,608,019 A | 3/1997 | Cheruvu et al. |
| 5,780,562 A * | 7/1998 | Shimizu et al. ............ 526/129 |
| 5,939,345 A | 8/1999 | Kobata et al. |
| 6,376,421 B2 * | 4/2002 | Sun et al. ................ 502/238 |

* cited by examiner

SUPPORTED METALLOCENE CATALYST, ITS PREPARATION METHOD AND OLEFIN POLYMERIZATION THEREWITH

CROSS REFERENCE TO RELATED APPLICATION

The application is based on application No. 98-44308 filed in the Korean Industrial Property Office on Oct. 22, 1998, the content of which is incorporated hereinto by reference.

BACKGROUND OF THE INVENTION (a) Field of the Invention

The invention relates to supported metallocene catalysts, their preparation, and their use in the polymerization and/or copolymerization of olefins. More particularly, this invention relates to a supported olefin polymerization catalyst prepared by a new process and its use for the polymerization of olefins.

Specifically, in a supported olefin polymerization catalyst prepared by such a process, the catalytically active species is deeply impregnated into the interior pore space of the support and evenly distributed throughout the porous support. Additionally, a novel preparation process does not lead to agglomeration of the catalyst particles. The catalyst of the invention operates in both a slurry polymerization and a gas phase polymerization. The catalyst produces granular olefin polymers with high polymerization activity. Moreover, the catalyst can yield high bulk density olefin polymers without reactor fouling and reactor carrier-line plugging and can significantly reduce the production of fines.

(b) Description of the Related Art

Ethylene or α-olefins including ethylene have been polymerized (homo- or copolymerized) by using titanium based catalyst systems composed of titanium compounds and a cocatalyst based on aluminum alkyls, or by using vanadium based catalyst systems composed of vanadium compounds and a cocatalyst based on aluminum alkyls. Recently, homogeneous or supported catalyst systems, based on metallocene compounds and aluminoxane or an ionizing compound as a activator, have also been useful in the polymerization of ethylene and copolymerization of ethylene/α-olefin.

"Metallocene" compounds refer to a derivative of a cyclopentadienyl metal complex which is a transition metal compound containing at least one cyclopentadienyl group bonded to a transition metal. The transition metal is selected from Groups 4b and 5b, preferably titanium, zirconium, hafnium. A number of metallocene compounds have been used to produce olefin polymers and copolymers.

Generally, metallocene compounds in combination with an activator have been used to produce olefin polymers or copolymers with high polymerization activity. The terms "cocatalysts" and "activators" are used interchangeably and are defined to be any compound or component which can activate a metallocene. These activators include aluminoxane (MAO), noncoordinating anions (ionizing compounds such as tri(n-butyl) ammonium tetra bis(pentafluorophenyl) boron or N,N-dimethylanilinium tetra (pentafluorophenyl) borate), which ionize the neutral metallocene compound. It is within the scope of this invention to use aluminoxane as an activator.

The catalyst system formed from the metallocene: and aluminoxane compound is generally referred to as a homogeneous catalyst system since the majority of this catalyst system is soluble in the reaction media and, in most cases, processes for the preparation of ethylene/α-olefin copolymers using this homogeneous catalyst system are applicable only to the solution polymerization system. However, when it is desired to produce high molecular weight polymers by using this catalyst, many inconveniences, such as a markedly increased viscosity of the solution media containing the resulting polymer, reduce polymerization productivity. Additionally, there are problems in that the resulting polymers have low bulk density and it is also difficult to obtain good morphological polymers with excellent particle characteristics. Also this homogeneous metallocene catalyst system has a tendency toward fouling and/or sheeting in a slurry and gas phase polymerization situation, and produces polymer fines which can be detrimental to commercial facilities.

Particularly in a continuous slurry process, fouling on the walls of the reactor which act as a heat transfer surface can result in many problems, including poor heat transfer in the polymerization process. Polymer particles that adhere to the walls of the reactor continue to polymerize and often fuse together and form chunks, which can be detrimental to a continuous process, particularly a fluid-bed process.

In a continuous gas phase process, recycled stream is continuously employed. The recycled stream is heated by the heat of polymerization, and in another part of the cycle (a heat exchanger), heat is removed by a cooling system external to the reactor. Fouling in a continuous gas phase process can lead to the ineffective operation of various reactor systems, for example the cooling system, temperature sensors, gas analyzing sensors, transfer pipes, and the gas distributor, which are often employed in a gas phase fluid-bed polymerization process.

Attempts to overcome the reactor operability issues associated with using metallocene catalyst systems, have resulted in the development of various techniques for supporting or producing a metallocene catalyst system with reduced tendencies for fouling. While all these possible solutions might reduce fouling or sheeting somewhat, some are not economical to employ and/or may not reduce both fouling and sheeting to a level sufficient for the successful operation of a continuous process, particularly a commercial or large-scale process.

Many attempts have been made to polymerize olefins in slurry or gas phase polymerization systems by using a catalyst composed of a metallocene compound and an aluminoxane, and at least one of the compounds has been supported on a porous inorganic oxide carrier, such as silica, alumina, and silica-alumina or mixtures thereof. For example, U.S. Pat. No. 4,937,217 describes a mixture of alkyl aluminums, such as trimethylaluminum and triethylaluminum added to an undehydrated silica to which a metallocene component is then added. U.S. Pat. Nos. 4,912,075, 4,937,301, and 4,935,397 generally describe the adding of trimethylaluminum to an undehydrated silica and then adding a metallocene to form a dry supported catalyst system. U.S. Pat. Nos. 5,008,228, 5,086,025, and 5,147,949 generally describe making a dry supported catalyst system by the addition of trimethylaluminum to a water impregnated silica to form aluminoxane in situ and then adding the metallocene. U.S. Pat. Nos. 4,808,561, 4,897,455, and 4,701,432 describe techniques to form a supported catalyst system where the inert carrier, typically silica, is calcined and contacted with a metallocene and an activator component. U.S. Pat. No. 5,238,892 describes forming a dry supported catalyst system by mixing a metallocene with an alkyl aluminum and then adding undehydrated silica. U.S. Pat.

No. 5,240,894 generally describes forming a supported metallocene/aluminoxane catalyst system by forming a metallocene/ aluminoxane reaction solution, adding a porous carrier to the solution, and evaporating the resulting slurry to remove residual solvent from the carrier, and the formed catalyst precursor is possibly subjected to prepolymerization. WO 94121691 describes forming a supported metallocene/aluminoxane catalyst system by forming a metallocene and aluminoxane reaction solution, contacting a porous carrier to the solution, wherein a volume of reaction solution is no greater than the total pore volume of said dehydrated silica, and then drying the catalyst under flowing nitrogen to remove residual solvent from the solid. U.S. Pat. Nos. 5,001,205, 5,308,816, and 5,455,316 describe forming a solid supported catalyst system by adding aluminoxane to a calcined silica and then adding a metallocene, decanting the resulting slurry to remove residual solvent, and washing. Thereafter the formed solid catalyst is possibly coated by a prepolymerization of olefins to improve the poor morphology of the original catalyst.

In prior art, the catalyst component solution does not penetrate into the capillary pores of the carrier, and the active catalyst components is precipitated on the surface of the support particle during the evaporation of solvent, and so the active catalyst components are unevenly distributed on the carrier. Some cases are multi-step and involve a lengthy preparation process, and a relatively low catalyst activity. Particularly when the catalyst is used in polymerization, there is a tendency to cause plugging problems during polymerization. In a slurry polymerization process, when the soluble catalyst portion is leaching out of the porous support and the polymer chains are grown from that, fines within the reactor often accumulated and cling or stick to the walls of a reactor. Polymer fines that adhere to the internal surfaces of reactor can continue to polymerize and result in fouling and plugging of the reactor, which can be detrimental to continuous and batch polymerization processes.

To overcome the unstability of the catalyst components on the support, U.S. Pat. Nos. 5,399,636, 5,466,766, and 5,473,020, as well as U.S. patent application Ser. No. 08/898,460 describe preparing a metallocene catalyst system which is chemically bonded on the organic or inorganic support. However, these methods have the problems involving a multi-step and lengthy preparation process, the removal of impurities, many isolation steps, and high cost or limitation of catalyst activity.

OBJECT OF THE INVENTION

The object of the present invention is to provide a new process for the preparation of a supported olefin polymerization catalyst. The invention is to provide to supply a supported olefin polymerization catalyst, reproducibly prepared by such a process, in which the catalyst components are deeply penetrated into the capillary pores of the support, and the catalyst species are uniformly distributed on the overall support.

The invention also aims at a supported olefin polymerization catalyst capable of producing good morphorogical olefin polymers with relatively high polymerization activity and, moreover, significantly reducing reactor-fouling and fines-production, and the preparation processes of such olefin polymerization catalyst as mentioned above.

Another object of the present invention is to provide a process capable of preparing olefin polymers having high bulk density and spherical olefin polymers with excellent particle characteristics at a high yield when one or more olefin monomers are (co)polymerized without another activator in process, using the supported olefin polymerization catalyst systems as mentioned above.

SUMMARY OF THE INVENTION

Figure 1:
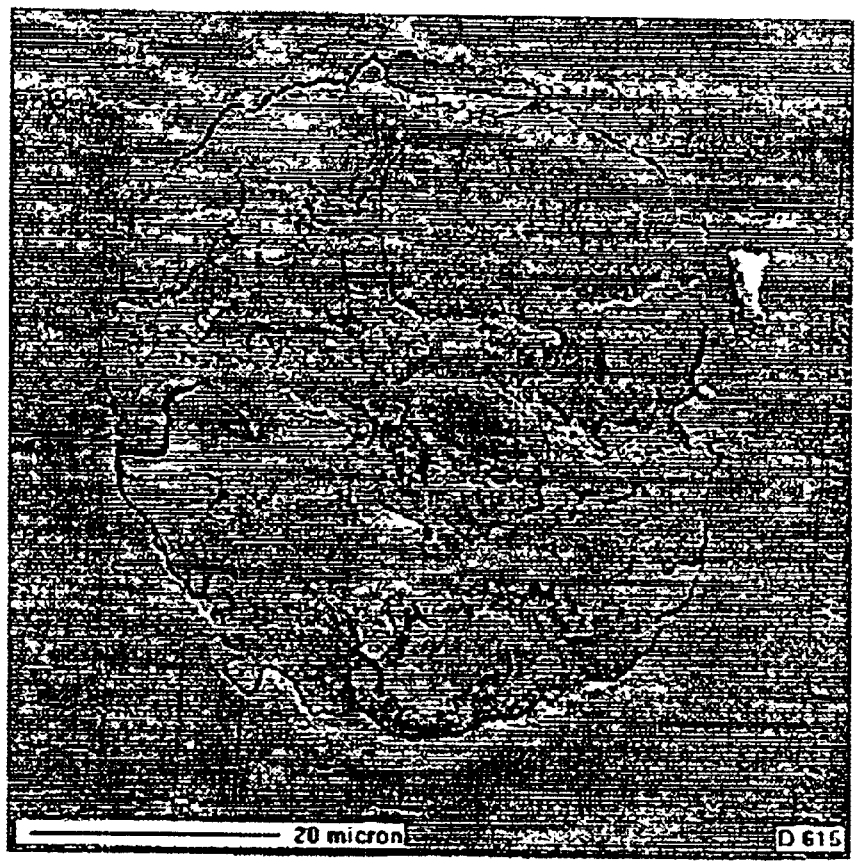
FIG. 1 is an image of the cross-section of the catalyst prepared by the present invention (example 17), detected by a scanning electron microscope (SEM).

The objects of the present invention have been accomplished with a new process for the preparation of a supported olefin polymerization catalyst. This invention is characterized by a new process for the preparation of a supported olefin polymerization catalyst and a supported olefin polymerization catalyst prepared by such a process, the process characterized by being comprised of the steps of (1) contacting a support, activators, and/or one or more metallocene components and/or Lewis acid additives and/or solvent, and then forming a slurry phase, (2) applying an ultrasonic wave or vibrating wave in the frequency range of 1~10,000 kHz, (3) washing the resultants with hydrocarbon solvent, and then drying, finally obtaining a supported olefin polymerization catalyst.

In above embodiment, a process is provided to prepare a supported olefin polymerization catalyst system in which one or more metallocene components, one or more activators, and/or Lewis acid additives are deeply penetrated into the interior of the pore space of a support and uniformly distributed on the overall porous support by using ultrasonic waves or vibrating waves.

In another embodiment, there is provided a process for polymerizing one or more olefin(s), alone or in combination, in the presence of a supported olefin catalyst systems where one or more metallocene components, one or more activators, and/or Lewis acid additives are evenly penetrated into the interior of the pore space of a support and uniformly distributed on the overall porous support by using ultrasonic waves or vibrating waves, where the process is in any polymerization or prepolymerization process, slurry, or gas phase process in a polymerization medium. The medium employed can be hydrocarbon such as propane, iso-butane, pentane, hexane, or heptane. The medium should be gas or liquid under the conditions of polymerization and relatively inert.

DETAILED DESCRIPTION OF THE INVENTION

According to this invention, a supported metallocene catalyst system is the olefin polymerization catalyst in which, practically, metallocene components and activators are evenly penetrated into the interior of the pore space of a support and uniformly distributed on the overall porous support. In this case, metallocene components can be one or more compounds, each with intrinsic adsorption properties on a support surface. It is desired that metallocene components, activators and/or Lewis acids are evenly distributed on the overall support.

According to the invention, an amount of metallocene components and that of activators to be impregnated in a support is limited to the total pore volume of the porous support. Therefore, the amount of metallocene in the support, on a transition metal element basis, will be approximately 0.1 to 4.0 wt %, preferably 0.2 to 2.0 wt %. The amount of aluminum from the activator in the support ranges from 1 to 40 wt %, preferably from 3 to 35 wt %, and most preferably from 5 to 30 wt %. The mole ratio of the aluminum of the activator compound to the transition metal of the metallocene component in the supported catalyst system is within the range 1:1 to 500:1, preferably 1:1 to 300:1, and more preferably 1:1 to 200:1. Since the activators are not used in excess, the present process for the preparation of catalysts results in a simple, commercially useful, and cost effective supported catalysts having a high activity.

The Lewis acid compound in the supported catalyst system of the invention can be added in the amount of 0.1 moles to 20 moles per mole of metallocene compound, preferably 0.5 moles to 5.0 moles, and more preferably 0.8 moles to 1.5 moles. If the amount of Lewis acid employed is more than 20 mole, reactor-fouling can result.

The supported metallocene catalysts, their preparation, and their use in the polymerization and/or copolymerization of olefins according to the present invention are illustrated below in detail.

In the present invention, the metallocene compound has the formula $$(Cp^*)_m MA_n B_p$$

where Cp* is a cyclopentadienyl type radical which includes unsubstituted cyclopentadienyl, substituted cyclopentadienyl, unsubstituted indenyl, substituted indenyl, unsubstituted fluorenyl, and substituted fluorenyl. The substituents on the cyclopentadienyl type radical can be aliphatic or cyclic hydrocarbyl radicals containing 1 to 12 carbon atoms, preferably 1 to 6 carbon atoms. The cyclopentadienyl type radical can be also be bridged by polymethylene ordialkylsilane type radicals, such as —$CR^1R^2$—, —$CR^1R^2$—$CR^1R^2$—, —$SiR^1R^2$—, —$SiR^1R^2$—$CR^1R^2$—$CR^1R^2$—$SiR^1R^2$— and similar bridge groups, where $R^1$ and $R^2$ are hydrogen or a hydrocarbyl radicals containing 1 to 8 carbon atoms. In the above formula of the metallocene compound, if A and B in the above formula of the metallocene compound are halogen, they are fluoride, chloride, bromide, or iodide. If A and B in the above formula of the metallocene compound are alkyl groups, they are preferably straight- or branched- chains or cyclic rings containing from 1 to 8 carbon atoms such as methyl, ethyl, n-propyl, isopropyl, n-butyl, isobutyl, n-pentyl, n-hexyl, or n-octyl. M in the above formula of the metallocene compound is a Group 4b or 5b metal such as titanium, zirconium, hafnium, or vanadium, preferably titanium, zirconium, or hafnium, and wherein m is 1 or 2, n is 0 to 3, p is 0 to 3 and m plus n plus p is equal to the valence of the metal.

Illustrative, but non-limiting examples of suitable metallocenes which can be employed according to this invention are bis(cyclopentadienyl) zirconium dichloride,
bis(cyclopentadienyl) hafnium dichloride,
bis(cyclopentadienyl) titanium dichloride,
bis(methylcyclopentadienyl) zirconium dichloride,
bis(methylcyclopentadienyl) hafnium dichloride,
bis(methylcyclopentadienyl) titanium dichloride,
bis(n-butylcyclopentadienyl) zirconium dichloride,
bis(n-butylcyclopentadienyl) hafnium dichloride,
bis(n-butylcyclopentadienyl) titanium dichloride,
bis(cyclopentadienyl) zirconium dimethyl,
bis(cyclopentadienyl) hafnium dimethyl,
bis(cyclopentadienyl) titanium dimethyl,
bis(methylcyclopentadienyl) zirconium dimethyl,
bis(methylcyclopentadienyl) hafnium dimethyl,
bis(methylcyclopentadienyl) titanium dimethyl,
bis(cyclopentylcyclopentadienyl) zirconium dichloride,
bis(cyclopentylcyclopentadienyl) hafnium dichloride,
bis(cyclopentylcyclopentadienyl) titanium dichloride,
bis(cyclohexylcyclopentadienyl) zirconium dichloride,
bis(cyclohexylcyclopentadienyl) hafnium dichloride,
bis(cyclohexylcyclopentadienyl) titanium dichloride,
bis(n-butylcyclopentadienyl) zirconium dimethyl,
bis(n-butylcyclopentadienyl) hafnium dimethyl,
bis(n-butylcyclopentadienyl) titanium dimethyl,
bis(1,3-dimethylcyclopentadiienyl) zirconium dichloride,
bis(1,3-dimethylcyclopentadienyl) hafnium dichloride,
bis(tetramethylcyclopentadienyl) zirconium dichloride,
bis(tetramethylcyclopentadienyl) hafnium dichloride,
bis(isobutylcyclopentadienyl) zirconium dichloride,
bis(isobutylcyclopentadienyl) hafnium dichloride,
bis(isobutylcyclopentadienyl) titanium dichloride,
bis(indenyl) zirconium dichloride,
bis(indenyl) zirconium dimethyl,
bis(indenyl) hafnium dichloride,
bis(indenyl) hafnium dimethyl,
bis(fluorenyl) zirconium dichloride,
bis(4,5,6,7-tetrahydro-1-indenyl) zirconium dichloride,
ethylene-[bis(4,5,6,7-tetrahydro-1-indenyl)] zirconium dichloride,
ethylene-bis(indenyl) zirconium dichloride,
ethylene-bis(indenyl) zirconium dimethyl,
ethylene-bis(indenyl) zirconium diphenyl,
dimethyisilyl-bis(indenyl) zirconium dichloride,
diphenylsilyl-bis(indenyl) zirconium dichloride,
dimethylsilyl-bis(indenyl) hafnium dichloride,
dimethylsilyl-bis(indenyl) titanium dichloride,
dimethylsilyl-bis(indenyl) zirconium dimethyl,
(9-fluorenyl)(cyclopentadienyl)methane zirconium dichloride,
(9-fluorenyl)(cyclopentadienyl)dimethyl methane zirconium dichloride,
dimethylsilyl-(9-fluorenyl)(cyclopentadienyl) zirconium dichloride,
diphenylsilyl-(9-fluorenyl)(cyclopentadienyl) zirconium dichloride,
dimethylsilyl-(9-fluorenyl)(cyclopentadienyl) zirconium dimethyl, and the like.

It is within the scope of this invention to use aluminoxane as an activator such as methylaluminoxane (MAO) or modified methylaluminoxane (MMAO). According to the present invention, any of the commercially available aluminoxanes are applicable. The known aluminoxane may be prepared, for example, by the following methods.

Suspensions of compounds containing adsorbed water or salts containing water of crystallization, for example, magnesium chloride hydrate, copper sulfate hydrate, aluminum sulfate hydrate, and nickel sulfate hydrate, in hydrocarbon solvents are allowed to react with an organoaluminum compound such as trialkylaluminum, and the desired aluminoxane is recovered as a hydrocarbon solution containing the same. An organoaluminum compound such as trialkylaluminum is treated directly with water, ice or water vapor in such a solvent as benzene, toluene, ethyl ether, or tetrahydrofuran, and the desired aluminoxane is recovered as a hydrocarbon solution containing the same.

Aluminoxane compounds are composed of oligomeric linear and/or cyclic hydrocarbyl aluminoxanes. According to one embodiment of the invention, the aluminoxane is a linear compound having structure represented by the formula, or the oligomeric, cyclic aluminoxanes can be represented by the formula,

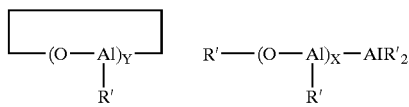

in which R' is an alkyl group comprising 1 to 10 carbon atoms, for example, methyl, ethyl, propyl, isopropyl, butyl, isobutyl, pentyl, hexyl, octyl, decyl, cyclohexyl, and cyclooctyl. Of these alkyl groups exemplified above, preferred are methyl and ethyl, and particularly preferred is methyl. X is 1 to 50, preferably 10 to 40, Y is 3 to 50, preferably 10 to 40, or a mixture of the linear and cyclic aluminoxane. Generally, the aluminoxanes are more active as polymerization catalysts when X and Y are greater than 4, more preferably at least about 10. Typically in the aluminoxanes used in the polymerization of olefins, the R group is predominantly methyl or ethyl. Preferably at least about 30 mole percent of the alkyloxyaluminum repeating groups have an R which is methyl, more preferably at least 50 mole percent, and still more preferably at least 70 mole percent of the repeating units have methyl as the R group.

It is considered that the present invention -can be applied to any of the above discussed aluminoxanes. Aluminoxanes are generally obtained commercially in the form of hydrocarbon solutions, generally aromatic hydrocarbon solutions, preferably toluene solution, since the more active higher molecular weight aluminoxanes are generally insoluble in aliphatic hydrocarbons.

In the supported catalyst composition of the present invention there is a little amount of Lewis acid compound represented by the formula $R_pMeX_q$, $(RBO)_3$, or $[(RO)BO]_3$ where R is an alkyl group having 1 to 10 carbon atoms, Me is Mg, Al, B, or Zn, B is boron, X is hydrogen or halogen, p is 1, 2, or 3, q is 0, 1, or 2, and p plus q equals the valence of Me. Many suitable Lewis acid compounds are commercially available. Examples of Lewis acid compounds include butylmagnesium chloride, diethylmagnesium, dibutylmagnesium, dimethylaluminum chloride diethylalurminum chloride, diethylaluminium hydride, ethylaluminum dichloride, trimethyl boroxine, triethyl boroxine, tri-n-propyl boroxine, tributyl boroxine, trimethoxy boroxine, triethoxy boroxine, triethylboron, dibutylboron chloride, triphenylboron, trimethylaluminum, triethylaluminum, triisopropylaluminum, triisobutylaluminum, and trihexylaluminum, preferably trimethyl boroxine, triethyl boroxine, trimethylaluminum, triethylaluminum, triisobutylaluminum, trimethoxy boroxine.

The support used in the preparation of the supported catalyst system according to the present invention can be any porous, particulate, substantially inert support such as inorganic powder, e.g., an inorganic oxide or salt.

Practically, the useful support is preferably a fine inorganic oxide such as an inorganic oxide of an element selected from Groups 2a, 3b, and 4 of the periodic table, most preferably silica, alumina, or a clay, modified clay, or a mixture derivative of these. Other inorganic oxides which can be used either alone or together with silica, alumina, or silica-alumina, are magnesium oxide, titanium dioxide, zirconium oxide, aluminium phosphate, etc.

Before being used, an inorganic oxide support must be dehydrated and possibly dehydroxylated. Such pretreatment may be a thermal treatment. Thermal treatment of the support is carried out either under vacuum or by fluidizing with a dry inert nitrogen gas in the range of about 100° C. to 800° C., preferably from 200° C. to 60° C.

In the most preferred embodiment, the support (carrier) is silica in the form of spherical particles. The support is used in the state of a dry powder having an average particle size (BET method) of from about 1 $\mu$m to about 250 $\mu$m, preferably about 10 $\mu$m to about 150 $\mu$m particle size. The surface area (BET method) of the support is at least about 5 to 1200 m$^2$/g, preferably about 50 to about 500 m$^1$/g. The pore volume of the support is from 0.1 to 5 cm$^3$/g, preferably about 0.1 to about 3.5 cm$^3$/g. The pore size (BET method) of the support is from 50 to 500 Å, preferably about 75 to about 300 Å. The support contains surface hydroxyl groups in the range of about 0 to 3.0 mmols per gram silica, preferably 0.5 to 2.5 mmols per gram silica. Content of surface hydroxyl groups depends on the dehydration and/or calcination temperature. Silica dehydrated at 600° C. can have a surface hydroxyl of about 0.7 to about 1.5 mmols per gram silica depending on silica types. Silica dehydrated at 800° C. can have a surface hydroxyl of about 0.5 to about 1.2 mmols per gram silica depending, on silica types. The silica support used in an embodiment according to the present invention is a material marketed under the trade names of Davison 948 or Davison 952 by the Davison Chemical Division of W.R. Grace and Company, MS 3030 or MS 3040 by the PQ Corporation, and ES70X by Crosfield LTD.

Process of Preparing the Supported Olefin Polymerization Catalyst of the Invention The supported metallocene catalyst system of the present invention can be prepared in the various ways.

Any solvent capable of forming a solution with at least one metallocene component and/or at least one activator can be used. Examples of solvents are saturated aliphatic, aromatic hydrocarbons and cyclic hydrocarbons, such as pentane, hexane, heptane, cyclopentane, cyclohexane, methylcyclopentane, benzene, toluene, xylene, cumene, cymene, and the like. The most preferred solvent is toluene.

In the present invention, it has been realized that a supported olefin polymerization catalyst can be obtained by a process which comprises of deeply penetrating metallocene and/or aluminoxane or metailocene/aluminoxane reaction product into the micro-pore space of a support by applying sonic waves or vibrating waves in the frequency range of 1~10,000 kHz. Preferably sonic waves or vibrating waves mentioned above are ultrasonic waves in the frequency range of 20~500 kHz. Sonic waves or vibrating waves mentioned above are the energy of a mass-transfer in a liquid medium and play the role of micro-stirring the materials in a porous support.

If necessary, Lewis acids or other additives are added to a solution or slurry containing one or more metallocene components, at least one activator (aluminoxane) and/or solvent. That solution containing metallocene, and/or activator, and/or Lewis acid is then added to a porous support, or vice-versa or any combination thereof. Then the sonic waves or vibrating waves are applied.

The supported catalyst system obtained by applying the sonic waves or vibrating waves is washed to remove weakly associated catalyst component(s), and then dried until it is a free-flowing powder. Any hydrocarbon may be used to wash the catalyst system. These hydrocarbons includes pentane, hexane, heptane, toluene, and mixture thereof. The most preferred hydrocarbon is hexane. Optionally, the sonic waves or vibrating waves may be applied during washing.

In one embodiment, first, a metallocene solution or an aluminoxane solution or a solution containing metallocene and aluminoxane (if necessary, Lewis acid additive may be combined) is formed in a solvent. These solutions are then contacted to a porous support irrespective of order. The mixture is slurried in a solvent. Then the sonic waves or vibrating waves are applied to the slurry for 1 to 2 hours.

The operation of the sonic waves or vibrating waves to the slurry mixture containing the catalyst components provides for a supported metallocene catalyst in which, practically, the components comprising catalyst are deeply penetrated into the capillary pores of the support and homogeneously distributed on the overall porous support. When the polymerization is carried out, in the range of 0° C. to 150° C., in a hydrocarbon medium such as propane, isobutane, or hexane, the soluble catalyst component(s) may be leached out during the polymerization process. Therefore the catalyst is washed to remove soluble catalyst component(s) by using a hydrocarbon solvent such as pentane, hexane, heptane, isoparaffin, toluene, and a mixture thereof in order to substantially reduce reactor fouling, sheeting and lineplugging.

In another embodiment, the aluminoxane solution is added to a support dehydrated and the mixture is slurried. The sonic waves or vibrating waves then are applied to the slurry. The resultants are rinsed with a solvent to form the porous support impregnated with activator and then dried. The support impregnated with activator and one or more metallocene components (powder or its solution) is homogenized. The solvent is then added to the mixture described above, irrespective of order. Thereafter the metaliocene mentioned above is penetrated into the capillary pores of the support treated with the activator by using the sonic waves or vibration waves in the frequency range of 1~10,000 kHz. If necessary, the catalyst is washed to remove soluble catalyst component(s) by using a hydrocarbon solvent and utilized in polymerization process.

In another embodiment, the metallocene and the activator are combined and formed a preactivated catalyst solution by using the sonic waves or vibration waves in the frequency range of 1~10,000 kHz. The preactivated catalyst solution of the metallocene and the activator is then added to a porous support, or vice-versa. The mixture become a slurry or mud-like state. Then the sonic waves or vibration waves are applied. If necessary, the solution including the Lewis acid additive may be added to the slurry or mud. The catalyst is washed to remove soluble catalyst component(s) by using a hydrocarbon solvent and dried. After the treatment of sonic or vibration waves, the components containing the metallocene, activator, and/or Lewis acid additive are deeply impregnated into the capillary pores of support and evenly distributed on and within the support. Moreover, applying the sonic waves or vibration waves does not lead to substantial agglomeration of impregnated catalyst particles, that is to say, the supported catalyst will be a free-flowing powder with a dry-feeling form after the treatment.

In another embodiment, a supported metallocene catalyst is prepared by a process using two metallocene components, activator, support. Such a process involves the following two step- procedures. The first preactivated solution containing the first metallocene component and the activator is formed. Then the second preactivated solution containing the second metallocene component and the activator is separately formed, wherein the second metallocene is different from the first. The volume of the first preactivated solution is required to reach the slurry stage when the first preactivated solution is applied to the support. Herein, when each metallocene is dissolved in activator solution or the solvent, each preactivated solution of a metallocene/activator must be homogeneous.

In further detail, the first preactivated catalyst solution of the first metallocene and the activator is added to a porous support, or vice-versa. The mixture becomes a slurry or mud-like state. The sonic waves or vibration waves are applied. Then the second preactivated catalyst solution is added to the mixture containing the first metallocene/ activator and support. Again the sonic or vibration waves are applied. If necessary, the solution including the Lewis acid additive may be added to the slurry or the mud. Finally, the catalyst is washed to remove soluble catalyst component(s) by using a hydrocarbon solvent and then dried.

In another embodiment, the conditions for preparing a supported metallocene catalyst system are as follows. Generally the temperature is in the range of from 0° C. to 100° C., preferably from 10° C. to 80° C. The period for applying the sonic waves or vibrating waves is in the range of from 30 min to 24 hour, and preferably from 1 to 5 hour. As stated above, it is preferable that the sonic or vibrating waves are ultrasonic waves in the frequency range of 20~500 kHz.

Preferably, the catalyst system of the invention is dried to a free-flowing powder. As a free-flowing powder, the supported catalyst system of this invention may still contain an amount of solvent, for example, hexane or toluene from the aluminoxane solution, in the pores of support. Therefore, all the solvent must be removed from the supported catalyst system by drying.

Figure 2:
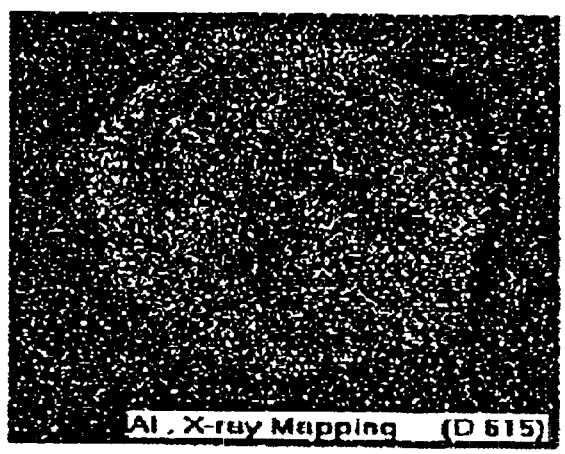
FIG. 2 is an Al distribution pattern image of the cross-section of the catalyst prepared by the present invention (example 17), mapped by the SEM/EDS.
Figure 3:
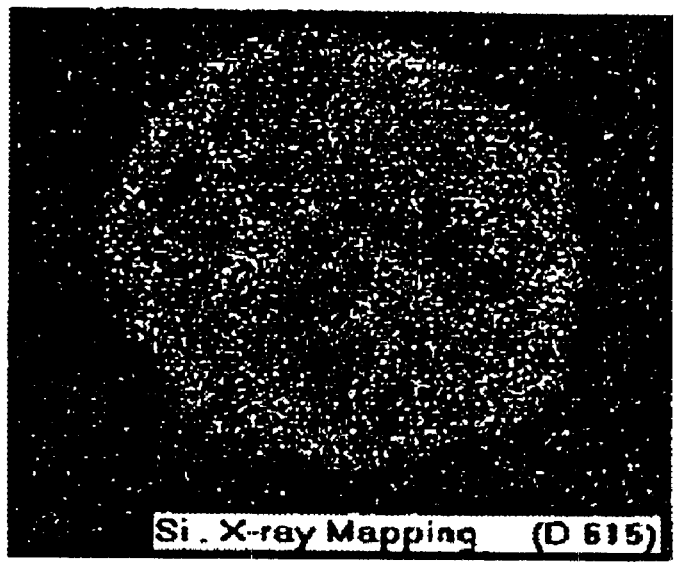
FIG. 3 is a Si distribution pattern image of the cross-section of the catalyst prepared by the present invention (example 17), mapped by the SEM/EDS

In the present invention, a supported metallocene catalyst prepared by applying the sonic or vibrating waves have benefits from the deep penetration and even distribution of catalyst components containing one or more metallocines and activators within and upon porous support particles (refer FIG. 2. Distribution of Al in the catalyst particle, mapped by a SEM-EDS method). The supported metallocene catalyst of the invention have good catalyst particle morphology and a high catalytic activity. From this catalyst, it follows that the morphology of the polymer particles, is also good, the bulk density of the polymer with respect to reactor operability is relatively high, less fines are produced in comparison to catalysts prepared in other ways (refer the comparative examples). Also, the present catalyst is less sensitive to impurities because the catalyst components are deeply penetrated and evenly distributed overall the pore space of the support.

Specifically, in a slurry and gas phase polymerization process, to sustain the reactor stability and the stable catalytic activity, the catalyst having a good thermal stability is required. Also, the designed catalyst is required in order to make polymer having broadened molecular weight distribution to enhance processability, and polymer having reinforced physical properties. To realize the aims mentioned above, the process applying the sonic and vibrating waves of this invention can use at least two metallocene components selected in consideration of activity, stability relative to impurities, molecular weight, and processability of polymer, etc. That is to say, the process of the present invention provides a method to prepare the supported catalyst in which two metallocene components and activator are deeply penetrated into the capillary pores of a support and evenly distributed on and within the support.

Another advantage of the invention is its simple and rapid preparation process capable of reproducing the homogeneous distribution of catalyst, and especially, with industrial scale-up production, is capable of achieving reproducibility for preparing catalyst having uniform properties.

Polymerization Process of the Invention

The supported metallocene catalyst system of this invention is suitable to the polymerization or copolymerization of monomers in any polymerization or prepolymerization process.

A variety of olefins are polymerized or copolymerized by using the supported catalyst system of this invention. Olefins which can be polymerized include aliphatic olefins having from 2 to 12 carbon atoms, preferably ethylene, propylene. The second α-olefin (comonomer) including from 3 to 12 carbon atoms can be employed in the copolymerization. Preferred comonomers include propylene, butene-1, pentene-1, 4-methylpentene-1, hexene-1, octene-1. Other monomers can include cyclopentene, dicyclopentadiene, norbornene, 5-ethylidene-2-norbornene, 5-vinyl-2-norbornene, 1,5-hexadiene, 1,4-hexadiene, 5-methyl-1,4-hexadiene, and 4-methyl-1,4-hexadiene.

The catalyst system of this invention is suspended in a diluent and polymerized or copolymerized under anhydrous conditions. The diluent is usually an aliphatic hydrocarbon solvent. The aliphatic hydrocarbon compounds or mixtures thereof are alkanes having straight- or branched-3 to 10 carbon atoms, for example, propane, isobutane, pentane, isopentane, hexane and isomers, heptane and isomers, and octane and isomers. Preferably alkane is propane, isobutane, petane, hexane, and heptane. The most preferred alkanes are propane, isobutane, pentane, and hexane.

The catalyst system of the present invention is suited for any polymerization process, for example, gas phase, slurry phase, and solution process. Also the polymerization processes can be carried out either batch-wise or continuously. The supported catalyst system of the present invention is particularly suited for a gas phase or slurry phase polymerization process. A slurry polymerization involves the batch-wise and/or continuous prepolymerization and thereafter the main polymerization wherein monomer, comonomer, catalyst, diluent, and optional molecular weight control agent (hydrogen) are added to the reactor.

According to the present invention, the olefin is prepolymerized by using the supported catalyst system of the invention prior to the main polymerization. The prepolymerization can be performed batch-wise or continuously in slurry or gas phase in the mild condition. The supported catalyst system of the invention can be polymerized in conjunction with a scavenger to enhance catalytic productivity.

In one embodiment of the batch-wise slurry process of the invention, a stirred autoclave is purged with nitrogen and then with an inert solvent, such as isobutane. After diluent and a scavenger are charged into the reactor, the catalyst is employed in the reactor. The reactor is heated to the desired reaction temperature and monomer, such as ethylene, is then admitted and maintained at these conditions thereinafter. If desired, a chain terminating agent, such as hydrogen, can be added. At the end of the designated reaction period, the polymerization reaction is terminated and the unreacted olefin and diluent can be vented. The reactor can be opened and the polymer can be collected as a free-flowing particulate polymer.

The slurry prepolymerization of the invention can be carried out at a total pressure of less than 500 psi. Generally the total pressure ranges from 10 to 300 psi, preferably from 10 to 250 psi. Ethylene partial pressure ranges from 18 to 300 psi, preferably from 20 to 125 psi. The slurry prepolymerization temperature of the invention is in the range of −10° C. to 80° C. Preferably, the temperature ranges from 10° C. to 50° C. The main polymerization of the invention is carried out at a total pressure of less than 800 psi. Generally the total pressure ranges from 100 to 800 psi and more preferably from 300 to 600 psi. Ethylene partial pressure ranges from 100 to 700 psi, preferably from 150 to 550 psi. The main polymerization of the invention will be conducted at a temperature in the range of 60° C. to 100° C. Preferably, the temperature ranges from 60° C. to 90° C.

In one embodiment of the batch-wise gas process of the invention, the slurry prepolymerization is conducted, and then a gas polymerization is carried out. The slurry prepolymerization is carried out at a total pressure of less than 450 psi. Generally the total pressure ranges from 100 to 450 psi, preferably from 150 to 400 psi. Ethylene partial pressure ranges from 20 to 250 psi, preferably from 40 to 200 psi. The slurry prepolymerization temperature of the invention is in the range of −10° C. to 60° C. Preferably, the temperature ranges from 10° C. to 50° C. The main gas polymerization is carried out at a total pressure of less than 800 psi. Generally the total pressure ranges from 100 to 700 psi and more preferably from 250 to 550 psi. Ethylene partial pressure ranges from 10 to 500 psi, preferably from 40 to 200 psi. Temperature ranges from 60° C. to 100° C. Preferably, the temperature ranges from 60° C. to 90° C.

In one embodiment of the batch-wise gas process alone, the gas polymerization is carried out at a total pressure of less than 800 psi. Generally, the total pressure ranges from 100 to 700 psi, preferably from 250 to 550 psi. Ethylene partial pressure ranges from 10 to 500 psi, preferably from 40 to 300 psi. Temperature ranges from 60° C. to 100° C. Preferably, the temperature ranges from 60° C. to 90° C.

When a polyethylene with a density of less than about 0.95 g/cc is to be produced, a comonomer containing α-olefin of 3 to 8 carbon atoms is used for copolymerization with ethylene. The α-olefin will be present in the amount of about 0.01 moles to about 1.0 moles per mole of ethylene in the diluent, preferably about 0.05 moles to about 0.8 moles.

The residence periods of prepolymerization can range from 0 to 4 hours, preferably 0.5 to 2 hours, and that of the main polymerization can range from 0.5 to 10 hours, preferably 1 to 4 hours. Under above conditions, when olefin polymerization is carried out by using the supported catalyst system, particulate polymer is produced in the gas or slurry process. The average particle size of the product is in the range of 50 to 5000 μm depending on the catalyst system employed and polymerization conditions. Preferably, the average particle size of the product is in the range of 120 to 3000 μm. In a gas or slurry process according to the invention, the bulk density of the product is in the range of 280 kg/m$^3$ to 700 kg/m$^3$.

Another example of the polymerization process of polyolefin with the supported catalyst of this invention is a continuous fluid-bed gas phase polymerization process described as follows. It is possible to prepolymerize slightly ethylene and/or comonomers and/or hydrogen in a slurry before the continuous fluid-bed gas phase polymerization. The amounts of the prepolymer is preferably 1 to 500 grams per g of the catalyst, and more preferably 5 to 200 grams. A continuous stirred tank reactor and/or a loop reactor, filled with an inert hydrocarbon such as propane, butane, isobutane, hexane, and heptane, etc., can be used for the prepolymerization. However, the supported catalysts of this invention can be directly used for the fluid bed gas-phase polymerization without the prepolymerization needs additional equipment.

When the supported catalysts of this invention are used in the continuous fluid-bed gas phase polymerization, some inert gas is needed for preventing the polymerization from overheating, and the inert gas is nitrogen or saturated hydrocarbons like such as ethane, propane, butane, isobutane, etc. The supported catalysts can be fed continuously and constantly into the reactor as a powdered form with the inert gas, or in a slurry form with the inert hydrocarbon, or a mud-like form dispersed regularly in viscous oil or grease.

There is no need for additional cocatalysts because the supported catalysts in this invention include active catalyst ingredients and the activator together in the support, but some amounts of a aluminum alkyl can be used as the scavenger for removing the catalyst deactivators which can be included in the reaction systems or raw materials. In the examples of this invention, trisobutyl aluminum (TIBAL) was used as a scavenger, and trimethyl aluminum (TMA) or triethyl aluminum (TEAL) can also be used as scavenger. It is preferable that the feeding rate of triisobutyl aluminum is 0.1~10 grams per a gram of the supported catalyst, and more preferable 0.5~5 grams per a gram of the catalyst.

Additionally, when the supported catalysts in the invention are used in the continuous fluid-bed gas phase polymerization, it is possible to use the antistatic agent known generally to prevent the making of agglomerates and/or reactor fouling, and the antistatic agent may be fed together with the catalysts and/or directly to the gas phase reactor. The feed rate of the antistatic agents is a weight ratio to the feed rate of the scavenger, and the ratio is preferably 0~1 grams per g of TIBAL, and more preferably 0.1~0.5 grams per g.

When the supported catalysts in the invention are used in a continuous fluid-bed gas phase polymerization, the reaction systems may consist of one gas phase reactor or two or more gas phase reactors connected in series. In the case of using two gas phase reactors, the polymer fluffs grown in the first reactor can be transferred to the next one by series of the control valves due to the pressure difference between the reactors and/or transferring systems, the so called "piff-poff," which is the pressurizing of the polymer fluffs after depressurizing by series of the control valve operations, and the amounts of the polymer fluffs to be transferred can be controlled by the fluid bed reactor bed height level control system. The reactor temperature may be set by the melting temperature of the polymer to be produced, and it can be produced from low-density to high-density polyethylene in a reactor temperature of 55~85° C. by the catalysts in this invention. In the case of the two series reactors, the temperature of each reactor may be the same or different, and the pressure of the first reactor has to be higher by about 28 psig than the second reactor for the transferring of the polymer fluff by this pressure difference, and maybe be the same or lower than the second reactor if the "piff-poff" method is used.

The reactants of the fluid-bed gas phase polymerization consumed in the fluid bed by polymerizing on the catalysts, the unreacted reactants, and the inert gas passed from the bottom to the top of the fluid bed all pass the heat exchanger for removal of the heat of reaction, and then are compressed by the compressor, and then enter beneath of the fluid bed to fluidize the bed. The composition of the reactants is controlled to be constant by the additional feed of reactants consumed in the feeding system reaction zone using the data of the on-line gas chromatography of the recirculating gas stream. When more than two gas-phase reactors are employed, the composition of the reactants of each reactor is controlled independently, and the target composition can be set differently by the density and the melt index of the polymer to be produced. When the supported catalysts of the present invention are used in a continuous fluid-bed gas phase polymerization, the composition of the gas phase reactor may vary according to the polymer properties to be produced, and the ethylene concentration in the gas phase reactor may be 10~70 mol %, preferably 15~65 mol %. The concentration of the comonomers are varied by the polymer density needed as well as the kind of comonomers, and the hydrogen concentration is also varied by the melt index of the polymer needed.

When the supported catalysts of the present invention are used in a continuous fluid-bed gas phase polymerization, the polymer fluff out of the last reactor can be treated by the low pressure steam to remove the residual reactants and hydrocarbons and to deactivate the active catalysts. It can then be dried for the removal of water.

When the supported catalysts of the invention are used in a continuous fluid-bed gas phase polymerization, the mean particle size of the polymer fluff is related to the kind of the catalysts used, the kind of supports, and the polymerization conditions, but generally ranges from about 50~5,000 μm, preferably 120~3,000 μm, and the bulk density of the polymer fluff is about 280~700 kg/m$^3$.

EXAMPLES

Example 1

Preparation of the Supported Metallocene Catalyst

Twenty (20) ml of toluene was combined with 2.0 g of silica (MS 3040 the PQ corporation) which were dried under a vacuum at 200° C. for 24 hours to form a suspension. 4.58 g MMAO-4 in toluene solution of (6.4 wt % Al, 0.88 g/ml, Akzo Chemicals Inc.) were added to the mixture at 25° C. Then 25 kHz ultrasonic waves were applied to the slurry at 25° C. for 1 hour, and the temperature was elevated to 60° C. for 1 hour. Thereafter, the temperature was cooled to 25° C., followed by removing the solvent by decantation and washing the solid with toluene. The solid was dried under a vacuum overnight. A finely divided, free-flowing solid was obtained. 0.127 g ethylene-bis(indenyl)zirconium dichloride (0.3 millimoles Zr) were mixed with the solid of silica treated with MMAO4, and the mixture was homogenized perfectly with a blade. 20 ml of toluene were added to the solid mixture at 25° C., followed by applying the 25 kHz ultrasonic waves, and simultaneously the reaction temperature was elevated to 65° C. for 2 hours. The temperature was then cooled to 25° C. The solvent was removed by decantation. Thereafter, the catalyst was thoroughly washed with toluene. The solid was dried under a vacuum overnight. A finely divided, free-flowing solid was obtained as a result. Elemental analysis showed 0.42 wt % Zr and 7.2 wt % Al.

Slurry Polymerization

Three (3.0) millimoles of triisobutylaluminum(Tibal) and 400 ml of isobutane were added and stirred at 50° C. in a 1 liter autoclave reactor which was purged with nitrogen and isobutane. Then 100 ml of isobutane and 47 mg of the supported catalyst were added to the reactor. The catalyst was prepolymerized at 50° C. for 2 hours. During the prepolymerization, the pressure of ethylene was 130 psi. After the completion of the ethylene homo-prepolymerization, 0.24 moles of hexene-1 was added to the reactor, and the reaction temperature was elevated to 80° C. The main polymerization was carried out at 80° C. for 80 min. The pressure of ethylene was 170 psi. During the main polymerization, the amount of hydrogen used was 40 ml at STP. The polymerization reaction was terminated and the unreacted hexene-1 and isobutane were vented. The reactor was then opened. The polymer was easily collected from the reactor as a free-flowing solid polymer and there were little signs of reactor fouling. The results are described in Table 1.

Comparative Example 2

The catalyst was prepared as in Example 1 except for the replacement of the treatment of ultrasonic waves by stirring. The polymerization conditions were the same as in Example 1. The results are described in Table 1.

Example 3

Preparation of the Supported Metallocene Catalyst

Twenty (20) ml of toluene were combined with 3.0 g of silica. (MS 3040, PQ corporation) which were dried under a vacuum at 200° C. for 24 hours to form a suspension. Then, a 9.68 g MMAO4 solution in toluene (6.4 wt % Al, Akzo Chemicals) were added to the mixture. Following this, 25 kHz ultrasonic waves were applied to the slurry at 25° C. for 1 hour. 69.4 mg trimethoxyboroxine(0.4 mmol) were added to the mixture and the temperature was elevated to 70° C. for 2 hours. Thereafter the temperature was cooled to 25° C., followed by removing the solvent by decantation and washing the solid with toluene. The solid was dried under a vacuum overnight. A finely divided, free-flowing solid was obtained.

0.148 g of ethylene-bis(indenyl)zirconium dichloride (0.35 mmol) were mixed with the silica solid treated with MMAO-4, and was perfectly homogenized. Twenty (20) ml of toluene were added to the solid mixture at 25° C., followed by applying 28 kHz ultrasonic waves, and simultaneously the reaction temperature was elevated to 70° C. for 2 hours. The temperature was cooled to 25° C. The solvent was removed by decantation. 0.1 mmol of trimethylaluminium were added to the mixture and 28 kHz ultrasonic waves were applied for 10 min. Thereafter the catalyst was thoroughly washed with toluene. The solid was dried under a vacuum overnight. A finely divided, free-flowing solid was obtained as a result. Elemental analysis showed 0.44 wt % Zr and 13.0 wt % Al.

Slurry Polymerization

Four hundred (400) ml of isobutane and 2.5 millimoles of triisobutylaluminum(Tibal) were added and stirred at 30° C. in a 1 liter autoclave reactor which was purged with nitrogen and isobutane. Then 100 ml of isobutane and 50 mg of the supported catalyst were added to the reactor. The catalyst was prepolymerized at 30° C. for 1 hour. During the prepolymerization, the pressure of ethylene was 90 psi. After the completion of the ethylene homo-prepolymerization, 0.24 moles of hexene-1 were added to the reactor, and the reaction temperature was elevated to 80° C. The main polymerization was carried out at 80° C. for 50 min. The pressure of ethylene was 231 psi. During the main polymerization, the hydrogen amount used was 60 ml at STP. The polymerization reaction was terminated and the unreacted hexene-1 and isobutane were vented. The reactor was then opened. The polymer was easily collected from the reactor as a free-flowing solid polymer and there were little signs of reactor fouling. The results are described in Table 1.

Comparative Example 4

A catalyst was prepared as in Example 3 except for the replacement of the treatment of ultrasonic waves by stirring, The polymerization conditions were the same as Example 3. The results are described in Table 1.

Example 5

Preparation of the Supported Metallocene Catalyst

Twelve (12) ml of the preactivated catalyst solution in toluene were prepared by combining 5.02 g 30 wt % MAO solution in toluene (13 wt % Al, 0.93 g/ml, Witco), 0.1 g ethylene-bis(indenyl)zirconium dichloride (0.24 millimoles Zr), and toluene. 0.15 mmol of trimethoxyboroxine were added to the mixture and 28 kHz ultrasonic waves were applied. 2.0 g of silica (MS3040, PQ corporation), dried under a vacuum at 200° C., were poured into the preactivated catalyst solution mentioned above, and 10 ml of toluene was added to the slurry. Then, 30 kHz ultrasonic waves were applied for 1 hour. During the additional ultrasonic treatment, the temperature was elevated to 60° C. for 2 hours. Thereafter the temperature was cooled to 25° C., followed by removing the solvent by decantation. The solid was thoroughly washed with toluene and hexane. The solid catalyst was dried under flowing nitrogen for 2 hours and in a vacuum overnight. A finely divided, free-flowing solid catalyst was obtained.

Elemental analysis showed 0.47 wt % Zr and 20.1 wt % Al.

Slurry Polymerization

Four hundred (400) ml of isobutane and 0.5 millimoles of Tibal were added and stirred at 30° C. in the 1 liter autoclave reactor which was purged with nitrogen and isobutane. Then 100 ml of isobutane and 35 mg of supported catalyst were added to the reactor. The catalyst was prepolymerized at 30° C. for 1 hour. The pressure of ethylene was 90 psi. After the completion of the ethylene homo-prepolymerization, 0.08 moles of hexene-1 were added to the reactor. The main polymerization was carried out at 80° C. for 50 min. During the main polymerization, ethylene pressure was 231 psi, the amount of hydrogen used was 60 ml at STP, and the amount of hexene-1 used was 0.32 moles. The polymerization reaction was terminated and the unreacted hexene-1 and isobutane were vented. The reactor was then opened. The polymer was easily collected from the reactor as a free-flowing solid polymer and there were shown little signs of reactor fouling. The results are described in Table 1.

Comparative Example 6

A catalyst was prepared as in Example 5 except for the replacement of the treatment of ultrasonic waves by stirring, The polymerization conditions were the same as Example 5. The results are described in Table 1.

Example 7

Preparation of the Supported Metallocene Catalyst

Twelve (12) ml of the preactivated metallocene catalyst solution were prepared which contained 5.4 ml of 30 wt %

MAO solution in toluene (13 wt % of Al, 0.93 g/ml Witco), and 0.1 g ethylene-bis(indenyl)zirconium dichloride(0.24 millimoles Zr). 2.03 g of silica (MS 3030, PQ corporation), calcinated at 600° C. for 10 hours, were poured into the solution containing Et(Ind)$_2$ZrCl$_2$ and MAO. Then 8 ml of toluene were added to the mixture, and the 30 kHz ultrasonic waves were applied for 1 hour. During the sonic treatment, the temperature was elevated to 60° C. for 1 hour. Thereafter the temperature was cooled to 25° C., followed by removing the solvent by decantation. The solid was thoroughly washed with toluene and hexane. The solid catalyst was dried under flowing nitrogen and then in a vacuum overnight. A finely divided, free-flowing solid catalyst was obtained. Elemental analysis showed 0.46 wt % Zr and 19.8 wt % Al.

Slurry Polymerization

The polymerization conditions were the same as Example 5 except for the using of 29 mg of supported catalyst. The results are described in Table 1.

Comparative Example 8

Preparation of the Supported Metallocene Catalyst

Twelve (12) ml of the preactivated metallocene catalyst solution was prepared which contained 5.4 ml of 30 wt % MAO solution in toluene (13 wt % of Al, 0.93 g/ml Witco) and 0.1 g of ethylene-bis(indenyl)zirconium dichloride(0.24 millimoles Zr). 2.03 g of silica (MS 3030, PQ corporation), calcinated at 600° C. for 10 hours, were poured into the solution containing Et(Ind)$_2$ZrCl$_2$ and MAO. Then 8 ml of toluene were added to the mixture, and the 30 kHz ultrasonic waves were applied for 1 hour. During the sonic treatment, the temperature was elevated to 60° C. for 1 hour. Thereafter the temperature was cooled to 25° C., followed by removing the solvent by decantation. Then 3.9 millimoles of trimethylaluminum and 0.3 millimoles of trimethoxy boroxine were separately added to the resultant slurry, followed by applying 20 kHz ultrasonic waves for 10 min. The solid was thoroughly washed with toluene and hexane. The solid catalyst was dried under flowing nitrogen and then in a vacuum for overnight. A finely divided, free-flowing solid catalyst was obtained. Elemental analysis showed 0.38 wt % Zr and 17.8 wt % Al.

Slurry Polymerization

The polymerization conditions were the same as Example 5 except for the using of 29 mg of supported catalyst. The results are described in Table 1. In this case, there were some little signs of reactor-sheeting and fines because total amount of trimethylaluminum and trimethoxy boroxine was excessively added as compared with a amount of metallocene compound.

Example 9

Preparation of the Supported Metallocene Catalyst

Twenty (20) ml toluene were combined with 3.0 g of silica (Davison 948) which were dried under a vacuum at 200° C. for 24 hours to form a suspension. 9.68 g MMAO-4 in toluene solution of (6.4 wt % Al, 0.88 g/ml, Akzo Chemicals Inc.) were added to the mixture at 25° C. Then ultrasonic waves was applied to the slurry at 25° C. for 4 hour, and the temperature was elevated to 70° C. during this time. Thereafter, the temperature was cooled to 25° C., followed by removing the solvent by decantation and washing the solid with toluene. The solid was dried under a vacuum overnight. A finely divided, free-flowing solid was obtained. 0.095 g bis(n-butylcyclopentadienyl)zirconium dichloride (0.235 millimoles Zr) were mixed with the solid of silica treated with MMAO4, and was homogenized perfectly with a blade. Twenty (20) ml of toluene were added to the solid mixture at 25° C., followed by applying 28 kHz ultrasonic waves for 2 hour. The temperature was cooled to 25° C. The solvent was removed by decantation. Thereafter the catalyst was thoroughly washed with toluene. The solid catalyst was dried under flowing nitrogen and then in a vacuum overnight. A finely divided, free-flowing solid catalyst was obtained. Elemental analysis showed 0.48 wt % Zr and 12.7 wt % Al.

Slurry Polymerization

Four hundred (400) ml isobutane and 2.0 millimoles Tibal were added and stirred at 30° C. in a 1 liter autoclave reactor which was purged with nitrogen and isobutane. Then 100 ml of isobutane and 43 mg of supported catalyst were added to the reactor. The catalyst was prepolymerized at 30° C. for 1 hour. The pressure of ethylene was 90 psi. After the completion of the ethylene homo-prepolymerization, 0.16 moles of hexene-1 were added to the reactor. The main polymerization was carried out at 80° C. for 40 min. During the main polymerization, ethylene pressure was 231 psi, the amount of hexene-1 used 0.16 moles. The polymerization reaction was terminated and the unreacted hexene-1 and isobutane were vented. The reactor was then opened. The polymer was easily collected from the reactor as a free-flowing solid polymer and there were little signs of reactor fouling. The results are described in Table 1.

Comparative Example 10

The catalyst was prepared as in Example 9 except for the replacement of the treatment of ultrasonic waves by stirring, The polymerization conditions were the same as Example 9. The results are described in Table 1.

Example 11

Preparation of the Supported Metallocene Catalyst 12.7 ml of the preactivated catalyst solution in toluene were prepared by combining 6.70 g 30 wt % MAO solution in toluene (13 wt % Al, 0.93 g/ml, Witco), 0.1 35g bis(n-butylcyclopentadienyl)zirconium dichloride (0.334 millimoles Zr), and toluene. 3.8 g of silica (ES70X, Crosfield), dried at 600° C. for 10 hours, were poured into the preactivated catalyst solution mentioned above. Then ultrasonic waves were applied at 30° C. for 1 hour. The solvent was removed and the solid catalyst was dried under flowing nitrogen and then in a vacuum overnight. A finely divided, free-flowing solid catalyst was obtained. Elemental analysis showed 0.43 wt % Zr and 14.6 wt % Al.

Slurry Polymerization

Four hundred (400) ml isobutane and 0.5 millimoles Tibal were added and stirred at 30° C. in a 1 liter autoclave reactor which was purged with nitrogen and isobutane. Then 100 ml of isobutane and 27 mg of supported catalyst were added to the reactor. The catalyst was prepolymerized at 30° C. for 1 hour. The pressure of ethylene was 90 psi. After the completion of the ethylene homo-prepolymerization, 0.08 moles of hexene-1 were added to the reactor. The main polymerization was carried out at 80° C. for 40 min. During the main polymerization, ethylene pressure was 231 psi, and the amount of hexene-1 used was 0.32 moles. The polymerization reaction was terminated and the unreacted hexene-1 and isobutane were vented. The reactor was then opened. The polymer was easily collected from the reactor as a free-flowing solid polymer and there were shown little signs of reactor fouling. The results are described in Table 1.

Example 12

Preparation of the Supported Metallocene Catalyst

Twelve (12.0) ml of the preactivated catalyst solution in toluene were prepared by combining 5.02 g 30 wt % MAO solution in toluene (13 wt % Al, 0.93 g/ml, Witco), 0.1 g bis(n-butylcyclopentadienyl)zirconium dichloride(0.247 millimole Zr), and toluene. 2.0 g of silica (MS3030, PQ Corporation), dried at 600° C. for 10 hours, were poured into the preactivated catalyst solution mentioned above. Then 5 ml of toluene were added to the mixture, and the 25 kHz ultrasonic waves were applied at 30° C. for 1 hour, followed by removing the solvent by decantation and then washing the solid with toluene. Then the solid catalyst was dried under flowing nitrogen and in a vacuum overnight. A finely divided, free-flowing solid catalyst was obtained. Elemental analysis showed 0.43 wt % Zr and 17.6 wt % Al.

Slurry Polymerization

The polymerization conditions were the same as Example 11 except for the using of 18 mg of supported catalyst. The results are described in Table 1.

Example 13

Preparation of the Supported Metallocene Catalyst 12.2 ml of the preactivated catalyst solution in toluene was prepared by combining 6.70 g 30 wt % MAO solution in toluene (13 wt % Al, 0.93 g/ml, witco), 0.135 g bis(n-butylcyclopentadienyl)zirconium dichloride(0.334 millimoles Zr), and toluene. Then 0.2 millimoles of trimethylaluminum and 0.2 millimoles of trimethoxy boroxine were separately added to the resultant slurry, followed by applying ultrasonic waves for 10 min. 3.8 g of silica (ES70X, Crosfield), dried at 600° C. for 10 hours, were poured into the preactivated catalyst solution mentioned above. Then ultrasonic waves were applied at 30° C. for 1 hour, followed by removing the solvent by decantation and then washing the solid with toluene. Following this, the solid catalyst was dried under flowing nitrogen and in a vacuum overnight. A finely divided, free-flowing solid catalyst was obtained. Elemental analysis showed 0.45 wt % Zr and 15.1 wt % Al.

Slurry Polymerization

The polymerization conditions were the same as Example 11 except that the amount of supported catalyst used was 25 mg and the period of the main polymerization was 30 min. The results are described in Table 1.

Example 14

Preparation of the Supported Metallocene Catalyst

Twelve (12.0) ml of the preactivated catalyst solution in toluene were prepared by combining 6.88 g 30 wt % MAO solution in toluene (13 wt % Al, 0.93 g/ml, Witco), 0.135 g bis(n-butylcyclopentadienyl)zirconium dichloride (0.334 millimoles Zr), and toluene. Then 4.0 g of silica (Davison 952), dried at 600° C. for 10 hours, were poured into the preactivated catalyst solution mentioned above. Then 2.0 ml toluene were added to the slurry and 30 kHz ultrasonic waves were applied at 30° C. for 1.5 hour, followed by removing the solvent by decantation. Following this, the solid catalyst was dried under flowing nitrogen and then in a vacuum overnight. A finely divided, free-flowinig solid catalyst was obtained. Elemental analysis showed 0.42 wt % Zr and 15.1 wt % Al.

Slurry Polymerization

The polymerization conditions were the same as Example 11 except that the amount of supported catalyst used was 24 mg and the period of the main polymerization was 1 hour. The results are described in Table 1.

Example 15

Preparation of the Supported Metallocene Catalyst

Twelve (12.0) ml of the preactivated catalyst solution in toluene were prepared by combining 6.88 g 30 wt % MAO solution in toluene (13 wt % Al, 0.93 g/ml, Witco), 0.131 g bis(indenyl)zirconium dichloride (0.334 millimoles Zr), and toluene. Then 4.0 g silica (ES70X, Crosfield), dried at 600° C. for 10 hours, were poured into the preactivated catalyst solution mentioned above. Then 4.8 ml toluene were added to the slurry and ultrasonic waves were applied at 30° C. for 1.5 hour, followed by removing the solvent by decantation. Following this, the solid catalyst was dried under flowing nitrogen and in a vacuum overnight. A finely divided, free-flowing solid catalyst was obtained. Elemental analysis showed 0.45 wt % Zr and 14.7 wt % Al.

Slurry Polymerization

The polymerization conditions were the same as Example 11 except that the amount of the supported catalyst used was 27 mg and the period of the main polymerization was 1 hour. The results are described in Table 1.

Example 16

Preparation of the Supported Metallocene Catalyst 11.8 ml of the preactivated catalyst solution in toluene were prepared by combining 6.88 g 30 wt % MAO solution in toluene (13 wt % Al, 0.93 g/ml, Witco), 0.135 g bis(iso-butylcyclopentadienyl)zirconium dichloride (0.334 millimoles Zr), and toluene. Then 4.0 g of silica (Davison 948), dried at 600° C. for 10 hours, were poured into the preactivated catalyst solution mentioned above. Then 4.6 ml toluene were added to the slurry and 28 kHz ultrasonic waves were applied at 30° C. for 1 hour, followed by removing the solvent by decantation. Following this, the solid catalyst was dried under flowing nitrogen and in a vacuum overnight. A finely divided, free-flowing solid catalyst was obtained. Elemental analysis showed 0.45 wt % Zr and 15.3 wt % Al.

Slurry Polymerization With Prepolymerization

The polymerization conditions were the same as Example 11 except that the amount of supported catalyst used was 27 mg and the period of the main polymerization was 1 hour. The results are described in Table 1.

Slurry Polymerization Without Prepolymerization

Four hundred 400 ml of isobutane, 0.5 millimoles of Tibal, and 0.32 millimoles of Hexene-1 were added and stirred at 65° C. in a liter autoclave reactor which was purged with nitrogen and isobutane. Then 100 ml of isobutane and 28 mg of supported catalyst were added to the reactor. The catalyst was polymerized at 70° C. for 100 min. During the polymerization, ethylene pressure was 180 psi, and the amount of hexene-1 used 0.53 moles. The polymerization reaction was terminated and the unreacted hexene-1 and isobutane were vented. The reactor was then opened. The polymer was easily collected from the reactor as a free-flowing solid polymer and there were shown little signs of reactor fouling. The results are described in Table 1.

Example 17

Preparation of the Supported Metallocene Catalyst 11.5 ml of the preactivated catalyst solution in toluene were prepared by combining 6.05 g 30 wt % MAO solution in toluene (13 wt % Al, 0.93 g/ml, Witco), 0.130 g bis(n-butylcyclopentadienyl)zirconium dichloride (0.321 millimoles Zr), and toluene. Then 4.0 g of silica (Davison 948), dried at 600° C. for 10 hours, were poured into the preactivated catalyst solution mentioned above. Then 30 kHz ultrasonic waves were applied at 30° C. for 110 min, followed by removing the solvent by decantation. Following this, the solid catalyst was dried under flowing nitrogen and a vacuum. A finely divided, free-flowing solid catalyst was obtained. Elemental analysis showed 0.43 wt % Zr and 14.6 wt % Al. The Al element of in the supported metallocene catalyst prepared above was mapped by SEM/EDS. In FIG. 2, it is shown that Al was homogeneously distributed inside the support particle.

Slurry Polymerization

The polymerization conditions were the same as Example 11 except that the amount of supported catalyst used was 20 mg and the period of the main polymerization was 20 min, and the amount of hexene-1 used was 0.40 moles. The results are described in Table 1.

Gas Phase Polymerization (Stirred Batch-wise)

Two hundred (200) ml of propane and 1.0 millimoles of Tibal were added and stirred at 30° C. in a 1 liter autoclave reactor which was purged with nitrogen and propane. Then 100 ml of propane and 29 mg of supported catalyst were added to the reactor. The catalyst was prepolymerized at 30° C., for 30 min. The pressure of ethylene was 90 psi. Then 0.106 moles of butene-1 was added to the reactor. The copolymerization was carried out at 30° C. for 1 hour. After the completion of the slurry prepolymerization, propane and ethylene were vent to achieve a total pressure of 230 psi in the reactor. 0.085 moles butene-1 and ethylene were added to the reactor to reach a total pressure of 330 psi. Then the gas phase polymerization was carried out at 80° C. for 65 min. During the polymerization, the amount of butene-1 added was 0.30 moles. The polymerization reaction was terminated and the unreacted feed was vented. The reactor was then opened. The polymer was easily collected from the reactor as a free-flowing solid polymer and there were shown little signs of reactor fouling. The results are described in Table 1.

Comparative Example 18

The catalyst was prepared as in Example 17 except for the replacing of the treatment of ultrasonic waves by stirring. The slurry polymerization conditions were the same as Example-11 except that the amount of supported catalyst used was 22 mg and the period of the main polymerization was 20 min, and the amount of hexene-1 used was 0.40 moles. The results are described in Table 1. In this case, the morphology of polymers was poor.

Example 19

Preparation of the Supported Metallocene Catalyst 22.0 ml of the preactivated catalyst solution in toluene were prepared by combining 19.5 g 10 wt % MAO solution in toluene (5.0 wt % Al, 0.885 g/ml, Witco) and 0.197 g .bis(n-butylcyclopentadienyl)zirconium dichloride(0.487 millimoles Zr). Then 6.0 g of silica (Davison 948), dried at 600° C. for 12 hours, were poured into the preactivated catalyst solution mentioned above. Then 30 kHz ultrasonic waves were applied at 30° C. for 1 hour. Separately, second 11 ml the preactivated catalyst solution in toluene were prepared by combining 9.74 g 10 wt % MAO solution in toluene (5.0 wt % Al, 0.885 g/ml, Witco) and 0.025 g dimethylsilyl-bis(indenyl)zirconium dichloride (0.056 millimoles Zr). The second preactivated catalyst solution mentioned above was added to the slurry containing bis(n-butylcyclopentadienyl)zirconium dichloride, MAO, and silica. Then 30 kHz ultrasonic waves were applied at 30° C. for 1 hour, followed by removing the solvent by decantation. Following this, the solid catalyst was washed with hexane and dried under flowing nitrogen and vacuum. The finely divided, free-flowing solid catalyst was obtained. Elemental analysis showed 0.30 wt % Zr and 7.98 wt % Al.

Slurry Polymerization

Four hundred (400) ml of propane and 1.0 millimoles of triisobutylaluminum were added and stirred at 30° C. in a 1 liter autoclave reactor which was purged with nitrogen and propane. Then 100 ml of propane and 22 mg of the supported catalyst were added to the reactor. The catalyst was prepolymerized with ethylene at 30° C. for 1 hour. The pressure of ethylene was 100 psi. After the completion of the ethylene homo-polymerization, 0.45 moles of butene-1 were added to the reactor. The main polymerization was carried out at 70° C. for 15 min. The pressure of ethylene was 240 psi. During the main. polymerization, the amount of butene-1 used was 0.85 moles. The polymerization reaction was terminated and the unreacted hexene-1 and propane were vented. The reactor was then opened. The polymer was easily collected from the reactor as a free-flowing solid polymer and there were little signs of reactor fouling. The results are described in Table 1.

Example 20

Preparation of the Supported Metallocene Catalyst

Twenty (20.0) ml of the preactivated catalyst solution in toluene were prepared by combining 17.6 g 10 wt % MAO solution in toluene (4.62 wt % Al, 0.88 g/ml, Albemarle) and 0.065 g bis(cyclopentylcyclopentadienyl)zirconium dichloride (0.153 millimoles Zr). Then 2.75 g of silica (Davison 948), dried at 250° C. for 12 hours, were poured into the preactivated catalyst solution mentioned above. Then 30 kHz ultrasonic waves were applied at 30° C. for 70 min, followed by removing the solvent by decantation. Then the residue was washed with hexane. The washing treatment was carried out a total of five times with the application of ultrasonic waves. The solid catalyst was dried under flowing nitrogen at 40° C. and then a vacuum. A finely divided, free-flowing solid catalyst was obtained. Elemental analysis (ICP-MS) showed 0.32 wt % Zr and 18.31 wt % Al.

Slurry Polymerization

Four hundred (400) ml of propane and 1.0 millimoles of Tibal were added and stirred at 63° C. in a 1 liter autoclave reactor which was purged with nitrogen and propane. Then 0.30 moles of hexene-1 were added to the reactor. Then 100 ml of propane and 22 mg of the supported catalyst were added to the reactor. The main polymerization was carried out at 70° C. for 1 hour. The pressure of ethylene was 100 psi and total pressure of the reactor was 490 psi. During the polymerization, hexene-1 was continuously added in the hexene/ethylene ratio of 6 wt %. The polymerization reaction was terminated and the unreacted hexene-1 and propane were vented. The reactor was then opened. The polymer was easily collected from the reactor as a free-flowing solid polymer and there were little signs of reactor fouling. The results are described in Table 1.

Example 21

Preparation of the Supported Metallocene Catalyst

Fifteen (15.0) ml of the preactivated catalyst solution in toluene were prepared by combining 13.2 g 10 wt % MAO solution in toluene (4.62 wt % Al, 0.88 g/ml, Albemarle) and 0.074 g bis(cyclopentylcyclopentadienyl)zirconium dichloride(0.173 millimoles Zr). Then, 4.0 g silica (Davison 948), dried at 250° C. for 12 hours, were poured into the preactivated catalyst solution mentioned above. Then 30 kHz ultrasonic waves were applied at 30° C. for 1 hour.

Separately, a second 5.0 ml of the preactivated catalyst solution in toluene was prepared by combining 4.4 g 10 wt % MAO solution in toluene (4.62 wt % Al, 0.88 g/ml, Albemarle) and 0.026 g ethylene-bis(indenyl) zirconium dichloride (0.062 millimoles Zr). The second preactivated catalyst solution mentioned above was added to the slurry containing bis(cyclopentycyclopentadienyl) zirconium dichloride, MAO, and silica. Then the ultrasonic waves were applied at 30° C. for 2 hour, followed by removing the solvent by decantation. Then the residue was washed with hexane. The washing treatment was carried out a total of five times. The solid catalyst was dried under flowing nitrogen and then in a vacuum. A finely divided, free-flowing solid catalyst was obtained. Elemental analysis (ICP-MS) showed 0.38 wt % Zr and 12.72 wt % Al.

Slurry Polymerization

The polymerization conditions were the same as Example 20. The results are described in Table 1.

Example 22

Preparation of the Supported Metallocene Catalyst

Fifteen (15.0) ml of the preactivated catalyst solution in toluene were prepared by combining 13.2 g 10 wt % MAO solution in toluene (4.62 wt % Al, 0.88 g/ml, Albemarle) and 0.014 g ethylene-bis(indenyl) zirconium dichloride (0.034 millimoles Zr). Then 4.0 g silica (Davison 948), dried at 250° C. for 12 hours, was poured into the preactivated catalyst solution mentioned above. Then 30 kHz ultrasonic waves were applied at 30° C. for 1 hour. Separately, a second 7.0 ml preactivated catalyst solution in toluene was prepared by combining 6.16 g 10 wt % MAO solution in toluene (4.62 wt % Al, 0.88 g/ml, Albemarle) and 0.086 g bis(cyclopentylcyclopentadienyl)zirconium dichloride(0.201 millimoles Zr). The second preactivated catalyst solution mentioned above was added to the slurry containing ethylene-bis(indenyl) zirconium dichloride, MAO, and silica. Then ultrasonic waves were applied at 30° C. for 1 hour, followed by removing the solvent by decantation. Then the residue was washed with hexane. The washing treatment was carried out a total of five times. The solid catalyst was dried under flowing nitrogen and then in a vacuum. A finely divided, free-flowing solid catalyst was obtained. Elemental analysis (ICP-MS) showed 0.36 wt % Zr and 11.7 wt % Al.

Slurry Polymerization

The polymerization conditions were the same as Example 20. The results are described in Table 1.

The embodiment results are presented below.

[Table 1]

| Example | Yield (g) | Activity | Bulk Density (Kg/m$^3$) | MI (g/10 min) | Density (g/mL) | Solubles (wt %) | Fines Amount (wt %) |
|---|---|---|---|---|---|---|---|
| 1 | 108 | 1690 | 490 | 0.97 | 0.925 | 0.21 | 1.1 |
| Comp.2 | 92 | 1440 | 455 | 0.82 | 0.93 | 0.64 | 1.8 |
| 3 | 150 | 3600 | 480 | 0.49 | 0.917 | 0.57 | 0.1 |
| Comp.4 | 126 | 3116 | 420 | 0.35 | 0.92 | 0.83 | 1.1 |
| 5 | 214 | 7340 | 542 | 0.02 | 0.917 | 0.93 | 0 |
| Comp.6 | 178 | 6105 | 430 | 0.01 | 0.928 | 0.91 | 1.5 |
| 7 | 175 | 7206 | 507 | 0.32 | 0.916 | 1.02 | 0 |
| Comp.8 | 150 | 6206 | 480 | 0.27 | 0.918 | 2.02 | 1.0 |
| 9 | 165 | 5755 | 350 | 1.29 | 0.925 | 0.03 | 0 |
| Comp.10 | 155 | 5406 | 330 | 1.37 | 0.921 | 0.4 | 0 |
| 11 | 195 | 8670 | 391 | 1.55 | 0.916 | 0.01 | 0 |
| 12 | 115 | 9583 | 372 | 1.23 | 0.917 | 0.02 | 0 |
| 13 | 105 | 8400 | 385 | 1.43 | 0.919 | 0.01 | 0 |
| 14 | 108 | 4500 | 340 | 1.65 | 0.918 | 0.04 | 0 |
| 15 | 120 | 5560 | 452 | 1.17 | 0.919 | 0.38 | 0 |
| 16 (No prepoly) | 119 | 2550 | 345 | 5.91 | | | 0 |
| 16 (prepoly) | 170 | 6296 | 388 | 3.50 | 0.919 | 0.38 | 0 |
| 17 (slurry) | 105 | 15300 | 415 | 1.19 | 0.922 | 0.45 | 0 |

-continued

| Example | Yield (g) | Activity | Bulk Density (Kg/m³) | MI (g/10 min) | Density (g/mL) | Solubles (wt %) | Fines Amount (wt %) |
|---|---|---|---|---|---|---|---|
| 17 (Gas phase) | 157 | 5000 | 362 | 1.06 | 0.926 |  | 0 |
| Comp.18 (Slurry) | 100 | 14600 | 350 | 1.40 | 0.925 | 0.55 | 0 |
| 19 | 113 | 16960 | 360 | 0.67 | 0.913 | 0.44 | 0 |
| 20 | 52 | 2370 | 390 | 0.31 | 0.920 |  | 0 |
| 21 | 99 | 4510 | 410 | 0.11 | 0.916 |  | 0 |
| 22 | 100 | 3390 | 368 | 0.39 | 0.919 |  | 0 |

Activity grams polymer per gram catalyst per hour (g-Polym/g.Cat.h)
MI measurement at 190° C. under a load of 2.16 kg
Solubles the amount of a n-decane soluble portion of polymer measured by dissolving 3 g polymer in 450 ml n-decane at 145° C., cooling the solution to 25° C., removing a n-decane insoluble portion by filtration, and recovering a n-decane soluble portion from the filtrate.
Fines Amount the amount of the fine powder of less than 150 μm measured by using sieves.

The good results of the supported catalyst prepared using the sonic waves or vibrations are shown in Table 1 and the advantage of this process could be seen clearly in comparison with catalysts prepared in different methods (comparative examples). According to the present invention, it has been realized that a supported catalyst prepared by sonic waves or vibrating waves was more active than that prepared by conventional incipient-immersing and stirring, and produces higher bulk density, lower soluble, polymer with a less amount of fines and achieves better morphological polymer than that prepared by stirring or conventional incipient-immersing. Moreover, this process using sonic waves or vibrating does not lead to substantial agglomeration of the catalyst particles.

Example 23

Preparation of the Supported Metallocene Catalyst

A preactivated catalyst solution in toluene was prepared by combining 13.0 kg 10 wt % MAO solution in toluene (4.62 wt % Al, 0.88 g/ml, Albemarle) and 30.86 g ethylenebis(indenyl)zirconium dichloride(74 millimoles Zr). Then 3.78 kg silica (Davison 948), dried at 350° C. for 12 hours, were poured into the preactivated catalyst solution mentioned above. Then 30 kHz ultrasonic waves were applied at 40° C. for 1 hour with stirring. Separately, a second preactivated catalyst solution in toluene was prepared by combining 3.44 kg 10 wt % MAO solution in toluene (4.62 wt % Al, 0.88 g/ml, Albemarle) and 63.22 g bis(cyclopentylcyclopentadienyl)zirconium dichloride (0.201 millimoles Zr). The second preactivated catalyst solution mentioned above was added to the slurry containing ethylenebis(indenyl) zirconium dichloride, MAO, and silica. Then 30 kHz ultrasonic waves were applied at 40° C. for 1 hour, followed by removing the solvent by filtration. Then the residue was washed with 20 liters hexane. The washing treatment was carried out a total of three times applying ultrasonic waves for 15 min. The solid catalyst was dried under flowing nitrogen at 40° C. 6.5 kg of the finely divided, free-flowing solid catalyst were obtained. Elemental analysis (ICP-MS) showed 0.36 wt % Zr and 13.85 wt % Al.

Slurry Polymerization

The polymerization conditions were the same as Example 20 except that the amount of supported catalyst used was 20 mg. Ninety-two (92) g polymer were obtained having 0.19 g/10 min of Ml, an activity of 4,600 g-Polym/g.Cat.h, a density of 0.919 g/cm³, a bulk density of 390 kg/m³, and no fine powder.

Continuous Fluid-bed Gas Phase Polymerization

The catalyst was tested in a pilot plant fluid-bed gas phase reactor. The pilot plant fluid-bed gas phase reactor consisted of two fluid-bed reactors connected in series, and the volume of the first reactor was 1.2 m³ and that of the second was 6 m³. All of these fluid-bed gas phase reactors included a compressor for recirculating of unreacted reactants and inert hydrocarbons, and a heat exchanger which removed heat of polymerization from the recirculating gas and/or controlled the fluid-bed temperature, and a series of controllers for reactor temperature, reactor pressure, and fluid-bed level. Polymer particles form the fluid bed of the reactor, and the level of the fluid bed was controlled by a series of control valves actuated by a differential pressure level controller and/or a radioactive level controller, and the dumped polymers from the reactor transferred to the next reactor or the post treating systems.

Ethylene, hydrogen, and comonomers enter into the above zone of the fluid-bed, and passed the heat exchanger, and were supplied under the fluid bed after compression by a compressor. The inert gas, propane, entered above of the fluid-bed and before stream of the compressor. The composition of the recirculation gas stream was controlled to the target composition by each of the flew controllers of ethylene, hydrogen, and comonomers. The composition of the recirculation gas was measured by an on-line gas chromatography, and this value was used by each of the gas flow controllers of the reactants and inerts for keeping the composition constant.

The supported catalysts entered into a precontacting pot with a high-speed agitator, filled with liquid propane, and then were introduced with liquid propane into the above zone of the fluid bed of the first gas phase reactor. The polymer fluff grown in the first fluid-bed reactor was introduced into the above zone of the second fluid-bed reactor through a series of the control valves actuated by the fluid-bed level controller of the first reactor. The polymer fluff grown in the second fluid-bed reactor entered, through a series of the control valves actuated by the fluid-bed level controller of the first reactor, into a steamer which removed unreacted hydrocarbon and deactivate the catalysts by contact with steam. After the polymer fluff resided for a residence time in the steamer, it was transferred to a dryer and then packaged on the flecon. The levels of the each fluid-bed reactor were maintained constant by the constant catalyst feed rate, transferring the same amounts of the polymer fluff grown in the each reactor to the next treating step. The reaction zone was where the polymer fluff grows was fluidized by the continuous gas flow of the recirculating gas and the new supply of the reactants and the inert hydrocarbon. Each reactor pressure was controlled by pressure transmitters and the pressure control valves attached in the each reactor, and the first reactor pressure was maintained 28 psig higher than the second reactor to allow the easy transfer of the polymer fluff. To maintain the constant reactor temperature, the temperature of the recirculating gas was continuously controlled up or down to accept the difference of the heat of the reaction.

Triisobutylaluminum (TIBAL) diluted 10 wt % with n-hexane was fed to the precontacting pot with the catalysts, and the feeding rate of TIBAL was a 3.5 weight ratio with respect to TIBAL/CATALYST.

There were three different examples in the pilot operating conditions for explaining the effect of the catalysts in this invention, and each condition and the polymer properties are provided in Table 2. In the all examples, the catalyst feed rate were 20 g/hr.

There were no polymer agglomerates and there was no reactor plugging nor plugging of the transfer line of the polymer fluff, and it is possible to operate the continuous fluid-bed gas phase reactor with the catalyst of the present invention. It was possible to control the polymer density with the concentration of comonomer, such as 1-hexene, and the melt index with hydrogen concentration in the gas phase reactor, where the various polymer with a broad range of density and melt indices were achieved with high productivity.

TABLE 2

| | Conditions and properties | | | | |
|---|---|---|---|---|---|
| | Index | Unit | A | B | C |
| The first reactor | Temperature | °C. | 70 | 70 | 70 |
| | Pressure | kgf/cm² | 23 | 23 | 23 |
| | Bed weight | kg | 120 | 120 | 120 |
| | Ethylene conc. | mol % | 45 | 45 | 50 |
| | Hydrogen conc. | mol % | 0.02 | 0.01 | 0 |
| | 1-hexene/ (1-hexene + ethylene) | mol ratio | 0.005 | 0.01 | 0.025 |
| | Melt index | g/10 min | 6 | 4 | 0.9 |
| | Density | g/mL | 0.960 | 0.937 | 0.918 |
| | Bulk density | Kg/m³ | 420 | 410 | 390 |
| | Fines contents | wt % | 0.1 | 0.1 | 0.05 |
| The second reactor | Temperature | °C. | 78 | 78 | 78 |
| | Pressure | kgf/cm² | 21 | 21 | 21 |
| | Bed weight | kg | 250 | 250 | 250 |
| | Ethylene conc. | mol % | 55 | 55 | 60 |
| | Hydrogen conc. | mol % | 0.02 | 0.01 | 0 |
| | 1-hexene/ (1-hexene + ethylene) | mol ratio | 0.005 | 0.01 | 0.025 |
| | Melt index | g/10 min | 6 | 4 | 1.0 |
| | Density | g/mL | 0.960 | 0.937 | 0.917 |
| | Bulk density | Kg/m³ | 420 | 410 | 390 |
| | Fines contents | wt % | 0 | 0 | 0 |
| | Ash contents | ppm | 150 | 160 | 200 |

What is claimed is:

1. A process for the preparation of supported metallocene catalysts, said process comprising the steps of:
   (1) contacting a porous support having a pore space interior with at least one component selected from the group consisting of at least one activator and at least one metallocene component,
   (2) forming a slurry phase,
   (3) treating the slurry phase by applying sonic waves or vibrating waves in the frequency range of 1–10,000 kHz,
   (4) washing the treated slurry phase with a hydrocarbon solvent, and
   (5) drying the washed slurry phase to obtain a supported metallocene polymerization catalyst having the at least one component selected from the group consisting of at least one activator and at least one metallocene component evenly penetrated into the pore space interior.

2. A process according to claim 1, wherein said sonic or vibrating waves are ultrasonic vibrations in the frequency range of 20–500 kHz.

3. A process according to claim 1, wherein said hydrocarbon solvent is selected from the group consisting of pentane, hexane, heptane, isoparaffin, toluene, xylene, and mixtures thereof.

4. A process according to claim 1, wherein Lewis acids are evenly distributed on said porous support.

5. A process according to claim 1, wherein said metallocene component has the formula, $(Cp^*)_m MA_n B_p$, where Cp* is a cyclopentadienyl or a substituted cyclopentadienyl group, A and B are selected independently from a group consisting of a halogen atom, a hydrogen atom and an alkyl group, M is a transitional metal of Group 4b and 5b in the periodic table, m is 1 or 2, n is 0 to 3, p is 0 to 3, providing that m plus n plus p is equal to the valance of the metal M.

6. A process according to claim 1, wherein said at least one activator is selected from the group consisting of a linear aluminoxane as per the following formula,

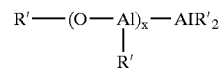

and a cyclic aluminoxane as per the following formula,

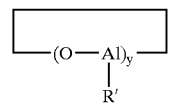

and mixtures thereof, wherein each R' is independently selected from the group consisting of linear and branched alkyl radicals, said radicals having 1 to 10 carbon atoms.

7. A process according to claim 1, wherein said porous support is selected from the group consisting of silica, alumina, silica-alumina, clay, modified clay and mixtures thereof.

8. A process according to claim 1, further comprising separately applying a second metallocene component to said supported metallocene polymerization catalyst.

9. A process for the preparation of supported metallocene catalysts, said process comprising the steps of:
   (1) contacting a porous support having a pore space interior with at least one component selected from the group consisting of at least one activator and at least one metallocene component,
   (2) forming a slurry phase,
   (3) treating the slurry phase by applying sonic waves or vibrating waves in the frequency range of 1–10,000 kHz,
   (4) washing the treated slurry phase with a hydrocarbon solvent, and
   (5) drying the washed slurry phase to obtain a supported metallocene polymerization catalyst having the at least one component selected from the group consisting of at least one activator and at least one metallocene component evenly penetrated into the pore space interior, wherein said at least one activator is selected from the group consisting of a linear aluminoxane as per the following formula,

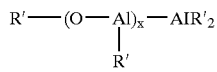

and a cyclic atuminoxane as per the following formula,

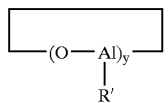

and mixtures thereof, wherein each R' is independently selected from the group consisting of linear and branched alkyl radicals, said radicals having 1 to 10 carbon atoms, and wherein said activators are combined with the first metallocene component to form a slurry or mud phase and further comprising the step of dissolving the second metallocene component using activators at a temperature ranging from 40–60° C.

10. A supported metallocene catalyst prepared by a process comprising the steps of:
(1) contacting a porous support having a pore space interior with at least one component selected from the group consisting of at least one activator, and at least one metallocene component,
(2) forming a slurry phase,
(3) treating the slurry phase by applying ultrasonic waves or vibrating waves in the frequency range of 1–10,000 kHz to said slurry phase,
(4) washing the treated slurry phase with hydrocarbon solvent, and
(5) drying the washed slurry phase, thereby producing a supported metallocene polymerization catalyst, wherein said at least one metallocene component and said at least one activator are penetrated into the pore space interior and distributed upon said porous support.

11. A catalyst according to claim 10, wherein Lewis acids are evenly distributed on said porous support.

12. An olefin polymerization process comprising a slurry or gas phase reaction which further comprises olefin reactants, a reaction solvent, a catalyst, and a support having a pore space interior, wherein:
(1) said reaction solvent is selected from the group consisting of propane, isobutane, pentane, hexane, and heptane;
(2) said olefin is selected from the group consisting of ethylene, propylene, 1-butene, isobutene, 1-hexene, 4-methyl-1-pentene, 1-octene and mixtures thereof; and
(3) said catalyst is a supported metallocene catalyst wherein more than one metallocene component, and more than one activator are substantially uniformly penetrated into the pore space interior and evenly distributed within and upon the pore space of said support.

* * * * *

UNITED STATES PATENT AND TRADEMARK OFFICE
CERTIFICATE OF CORRECTION

PATENT NO.   : 6,683,016 B1
DATED        : January 27, 2004
INVENTOR(S)  : Hyun-Ki Youn et al.

It is certified that error appears in the above-identified patent and that said Letters Patent is hereby corrected as shown below:

Column 1,
Line 66, "metallocene:" should read -- metallocene --.

Column 3,
Line 7, "WO 94121691" should read -- WO 94/121691 --.
Line 21, "prior art" should read -- prior-art --.

Column 7,
Line 38, "-can" should read -- can --.

Column 8,
Line 14, "60°C" should read -- 600°C --.
Line 21, "$m^1/g$" should read -- $m^2/g$ --.
Line 55, "metailocene/aluminoxane" should read -- metallocene/aluminoxane --.

Column 9,
Line 42, "metalocine" should read -- metallocene --.

Column 10,
Line 4, "step-" should read -- step --.
Line 45, "metallocines" should read -- metallocenes --.
Line 51, "particles," should read -- particles --.

Column 15,
Line 30, "MMAO4" each occurrence should read -- MMAO-4 --.

Column 18,
Line 4, "MMAO4" each occurrence should read -- MMAO-4 --.

Column 22,
Line 42, "the main." should read -- the main --.

UNITED STATES PATENT AND TRADEMARK OFFICE
CERTIFICATE OF CORRECTION

PATENT NO. : 6,683,016 B1
DATED : January 27, 2004
INVENTOR(S) : Hyun-Ki Youn et al.

It is certified that error appears in the above-identified patent and that said Letters Patent is hereby corrected as shown below:

Column 30,
Line 26, delete "supported"
Line 30, delete "within and"

Signed and Sealed this

Twenty-sixth Day of July, 2005

JON W. DUDAS
*Director of the United States Patent and Trademark Office*